United States Patent [19]

Tagawa et al.

[11] 3,779,224

[45] Dec. 18, 1973

[54] AIR-POLLUTION PREVENTIVE SYSTEM
[75] Inventors: Katsuhiro Tagawa; Takuzo Kurosawa, both of Tokyo, Japan
[73] Assignee: Nissan Motor Company, Limited, Kanagawa-ku, Yokohama City, Japan
[22] Filed: Mar. 1, 1972
[21] Appl. No.: 230,739

[52] U.S. Cl.............................. 123/136, 220/85 VS
[51] Int. Cl...................... B65d 25/00, F02m 59/00
[58] Field of Search................ 123/136; 220/85 VR, 220/85 VS

[56] References Cited
UNITED STATES PATENTS

| | | | |
|---|---|---|---|
| 3,517,654 | 6/1970 | Sarto et al. | 123/136 |
| 3,542,239 | 11/1970 | Latvala | 123/136 |
| 3,616,783 | 11/1971 | La Masters | 123/136 |
| 3,673,997 | 7/1972 | Sawada | 123/136 |
| 3,675,634 | 7/1972 | Tatsutomi | 123/136 |
| 3,687,335 | 8/1972 | Hunter | 123/136 |
| 3,695,376 | 10/1972 | Fiedler | 123/136 |

*Primary Examiner*—Laurence M. Goodridge
*Assistant Examiner*—Cort Flint
*Attorney*—John Lezdey

[57] ABSTRACT

An air-pollution preventive system for a gasoline-powered internal combustion engine, adapted to eliminate the evaporation of gasoline vapors from the fuel tank to the atmosphere. The gasoline vapors emitted from the fuel tank are introduced through a passage to the crankcase and admitted through the carburetor to the engine combustion chamber together with blow-by gases in the crankcase. The flow of gasoline vapors into the crankcase is controlled by a pair of check valves adapted to be responsive to pulsations of the pressure in the crankcase caused by the reciprocating motion of the piston. An additional valve is provided intermediate the passage leading from the fuel tank to the crankcase and is adapted to be automatically closed to block the passage upon opening of a closure member of a filler vessel for fuel replenishing purposes. The valve cooperates with an air escape pipe to prevent the fuel tank from being filled to its full capacity without leaving any unoccupied space for thermal expansion of the content.

5 Claims, 3 Drawing Figures

AIR-POLLUTION PREVENTIVE SYSTEM

This invention relates to an air-pollution preventive system for an internal combustion engine of a motor vehicle.

Vehicle hydrocarbon emissions cause air pollution in cities particularly where a number of motor vehicles run. A good percentage of this pollution is believed to be due to gasoline vapors which escape from the fuel tank vents of the motor vehicles.

It has been proposed to reduce the evaporation loss to the atmosphere by sealing the fuel tank vent while providing instead an auxiliary tank which is connected with the main tank through a passage to provide room for thermal expansion of the content. However, in replenishing the fuel tank of this type, a problem will arise that after the main tank has been filled to its full capacity, the fuel is permitted to enter the auxiliary tank through the passage, which would possibly cause the auxiliary tank also to be filled to its full capacity.

Another method for reducing the evaporation loss to the atmosphere is by introducing the gasoline vapors to the crankcase and then discharging them into the engine combustion chambers through the carburetor together with the blow-by gases in the crankcase, as is disclosed in our co-pending U.S. Pat. application Ser. No. 113,204. The flow of the vapors into the crankcase is controlled by two identically oriented valve means provided in a ventilation air inlet of the crankcase and adapted to be responsive to pulsations in the pressure in the crankcase. However, in this instance also, the fuel tank can actually be filled to its full capacity without leaving any room for thermal expansion of the content, because even after the fuel level in the tank has reached a point where it is contacted by the lowermost end of a depending air escape pipe, the air present in the remaining space of the fuel tank can escape to the crankcase through one of the two check valves.

It is therefore an object of this invention to provide an improved system for eliminating the evaporation loss to the atmosphere to reduce air pollution.

It is another object of this invention to provide an improved air-pollution preventive system including valve means which is automatically closed to block the fuel vapor passage leading from the fuel tank to the crankcase of the engine to prevent the fuel tank from being filled to its full capacity during replenishing.

These and other objects will be readily apparent from the following description of the invention when taken in conjunction with the accompanying drawings, in which.

Figure 1:
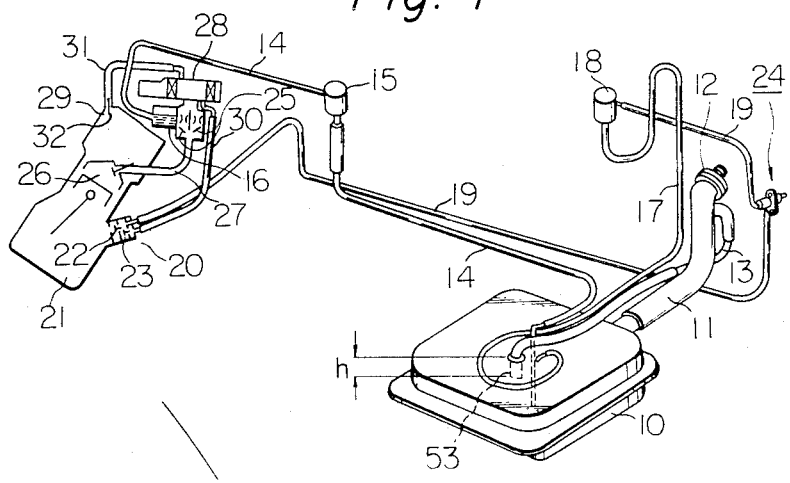
FIG. 1 is a schematic view of a preferred embodiment of this invention.

Referring now to FIG. 1, there is shown a typical fuel system of an internal combustion engine. The system comprises a fuel tank 10 having a filler pipe 11 attached thereto. The filler pipe 11 has a filler opening or a filler neck which is sealed off by a cap 12 and which extends into a filler vessel, as will be described hereinafter. The fuel tank 10 is also provided with an air escape pipe 13 having one end extending through the top wall of the fuel tank 10 and downwardly thereinto by a length $h$. The length $h$ is so determined as to insure that a suitable volume of unoccupied space is provided within the fuel tank 10 to accommodate thermal expansion of the content. The other end of the air escape pipe 13 is attached to the filler pipe 11 near the filler opening thereof to communicate with the same. The fuel system also includes fuel lines or conduits 14 connecting the fuel tank 10, fuel pump 15 and carburetor 16. As shown, the tank end of the fuel line 14 extends through the top wall of the fuel tank 10 and terminates at or near the bottom thereof.

A conduit 17 is provided which opens to the interior of the fuel tank 10 at or near the top thereof. The conduit 17 is also coupled to a separator 18 for absorbing fuel vapors emitted from the fuel tank 10. An absorbent mounted in the 18 may be, for example, activated carbons. The separator 18 communicates through a conduit 19 with a fuel vapor chamber 20 of a crankcase 21 at a point intermediate two identically oriented check valves 22 and 23 which form part of the crankcase ventilation system of the type as disclosed in our co-pending U.S. Pat. application Ser. No. 113,204. The fuel vapor chamber 20 has a ventilation air inlet mounting therein the check valve 23 and communicating with the atmosphere and a fuel vapor inlet mounting therein the check valve 22 and communicating with the crankcase 21.

According to this invention, there is provided intermediate the conduit 19 a normally open valve 24 which is automatically closed to block communication between the fuel tank 10 and the crankcase 21 upon opening of a closure member of a filler vessel for replenishing purposes, as will be described in detail in connection with FIGS. 2 and 3.

The crankcase ventilation system comprises, the carburetor 16 provided with a throttle valve 25 for controlling the flow of vaporized fuel entering the engine combustion chamber 26, an intake manifold 27 leading from the carburetor 16 into the combustion chamber 26, an air cleaner 28 associated with the carburetor 16, the crankcase 21 having the fuel vapor chamber 20 and a blow-by gass mixture outlet 29, a ventilation air passage 30 having one end communicating with the fuel vapor chamber 20 through the ventilation air inlet and the other communicating with the air cleaner 28, the two identically oriented check valves 22, 23 provided in the fuel vapor chamber 20 in series, a blow-by gas mixture passage 31 connecting the outlet 29 to the clean side of the air cleaner 28, and a check valve 32 provided in the blow-by gas mixture outlet 29.

The check valves 22 and 32 are so arranged that the valve 22 remains closed and the valve 32 opened when the pressure inside the crankcase 21 remains higher than the outside pressure and that the valve 22 remains opened and the valve 32 closed when the inside pressure remains lower than the outside pressure. Also, the valve 23 is so arranged as to remain opened when the pressure upstream thereof is higher than the downstream pressure and closed when the upstream pressure is lower than the downstream pressure. In response to pulsation of the pressure in the crankcase 21 caused by the reciprocating motion of the piston, these check valves 22, 23 and 32 are opened and closed so that fresh ventilation air and fuel vapors are introduced into the crankcase 21 and then admitted to the carburetor 16 together with a blow-by gas mixture. Thereafter, the fuel vapors are conducted to the engine combustion chamber 26 and consumed, while the blow-by gas mixture also is burned in the combustion chamber 26.

Thus, not only the air pollution is eliminated but also the fuel consumption is saved considerably.

Figure 2:
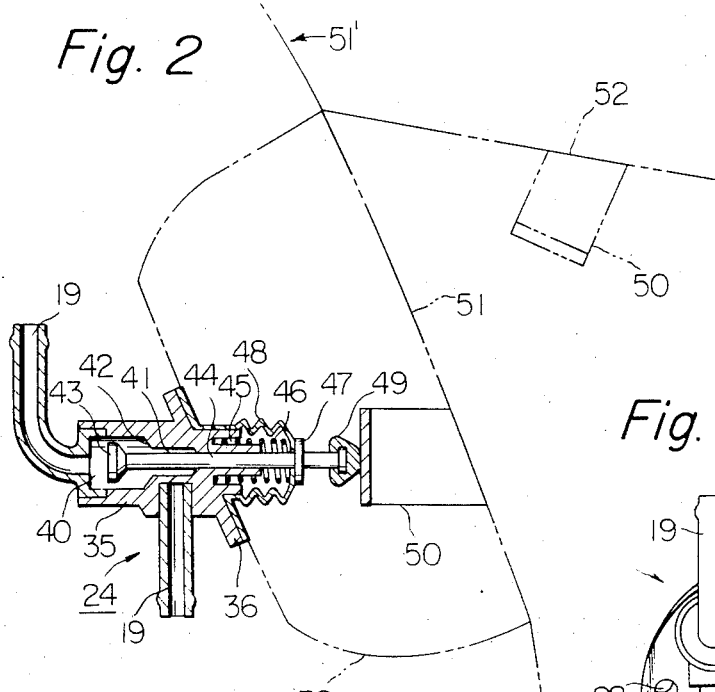
FIG. 2 is a longitudinal section of a preferred example of value means shown in FIG. 1.
Figure 3:
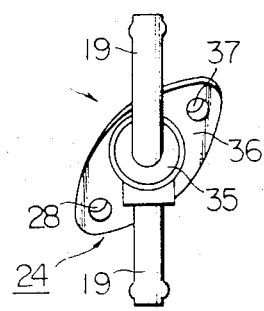
FIG. 3 is an end view of the valve means as seen from the left side of FIG. 2.

A preferred example of the valve 24 which is adapted to block the fuel vapor passage 17, 19 connecting the fuel tank 10 to the crankcase 21 during replenishing is shown in FIGS. 2 and 3. The valve 24 comprises a valve body 35 including a mounting member 36 which is integrally formed intermediate its length at a suitable angle relative to the longitudinal axis of the valve body 35. The mounting member 36, as is best shown in FIG. 3, has two holes 37, 38 adapted for use in securing the valve body 35 against the wall of a filler vessel 39 by the use of screws (not shown), which vessel 39 defines a space or a recess in an external surface of a motor vehicle such as a fender indicated generally as 51', and into which the filler opening of the filler pipe 11 projects. The valve body 35 has a valve chest 40 formed near one end thereof and communicating with the conduit 19 which leads to the separator or canister 18 (shown in FIG. 1). The valve chest 40 also communicates through a constricted portion 41 with the conduit 19 leading to the fuel vapor chamber 20 of the crankcase 21.

Provided between the valve chest 40 and the constricted portion 41 is a valve seat 42 of generally conical shape which cooperates with a valve head 43 to block communication through the conduit 19. The valve head 43 has a complementary conical portion and is carried by a valve stem 44 which in turn extends axially through the valve body 35. The valve stem 44 is slidable axially in the valve body 35 so as to cause the valve 24 to be opened and closed.

The valve body 35 has a circular groove 45 concentrically formed at the other end thereof and adapted to receive a coiled spring 46. The coiled spring 46 extends axially outwardly from the grooved end of the valve body 35 so as to encircle the valve stem 44. As is best shown in FIG. 2, the valve stem 44 has a circular stop 47 secured thereto by which the coiled spring 46 is compressed upon leftward movement of the valve stem 44. The coiled spring 46 and the grooved end of the valve body 35 are enclosed by a bellows-like cover 48 made of resilient material. At its end opposite to the valve head 43, the valve stem 44 carries a resilient member 49 made of, for example, hard rubber. The resilient member 49 is normally urged against a projecting member 50 which is securely mounted on the inside surface of a movable closure member or a lid 51 of the filler vessel 39 which normally covers same.

Now, in replenishing the fuel tank 10, the closure member 51 of the filler vessel 39 is rotated in a counter-clockwise direction to a position as indicated at 52 in FIG. 2. With the closure member 51 opened, the valve stem 44 is moved in a rightward direction as seen in FIG. 2 by the action of the coiled spring 46, so that the valve head 43 is caused to snugly rest on the generally conical valve seat 42, blocking communication through the conduit 19, that is, between the fuel tank 10 and the crankcase 21. Then, the cap 12 mounted on the filler opening is detached by manually rotating the same.

As the fuel or gasoline is poured into the fuel tank 10 through the filler pipe 11, the fuel level in the tank 10 gradually rises and, at the same time, the air in the remaining space of the fuel tank 10 escapes therefrom through the air escape pipe 13. However, when the fuel level reaches such a level that the lowermost end opening 53 of the air escape pipe 13 is plugged by the fuel, there is no way of escape left for the air remaining in the upper portion of the tank 10, since the passage leading from the fuel tank 10 to the crankcase 21 is blocked by the valve 24. Thus, it would be practically impossible to continue the pouring of fuel into the fuel tank 10. At this time, there is an unoccupied space left in the fuel tank 10, which has a height corresponding to the length $h$ of the depending end portion of the air escape pipe 13.

It should now be understood that by providing the valve 24 which is automatically closed to block communication between the fuel tank 10 and the crankcase 21, it is possible to prevent the fuel tank 10 from being filled to its full capacity without leaving any unoccupied space for thermal expansion of the content.

Upon completion of the replenishment of the fuel tank 10, the cap 12 is attached on the filler opening and the closure member 51 is rotated in a clockwise direction as seen in FIG. 2 to a position to close the filler vessel 39. With the closure member 51 closed, the projecting member 50 urges the resilient member 49 and accordingly the valve stem 44 in a leftward direction as seen in FIG. 2, causing the valve head 43 to move away from the valve seat 42. When this occurs, the valve chest 40 communicates with the constricted portion 41 establishing communication between the fuel tank 10 and the crankcase 21.

If, in this instance, gasoline vapors are given off from the fuel tank 10 due to a rise in the ambient temperature while the engine is off, these vapors are passed through the conduits 17, 19 to the fuel vapor chamber 20 and enter the crankcase 21 through the check valve 22 which remains opened due to the pressure difference between the inside and outside of the crankcase 21. When the engine is started, the gasoline vapors in the crankcase 21, together with the blow-by gases, are admitted through the blow-by gas mixture passage 31, the air cleaner 28, the carburetor 16 and the intake manifold 27 to the engine combustion chamber 26 for combustion therein.

What is claimed is:

1. An air-pollution preventive system for an internal combustion engine of a motor vehicle, said engine having a crankcase, a carburetor and a fuel tank having a filler pipe extending into a filler vessel which is formed in an external surface of said vehicle and which is covered by a movable closure member, an air escape pipe communicating with said filler pipe at a short distance from the filler opening of said filler pipe and projecting into said fuel tank a short distance below the top surface of said fuel tank and a fuel vapor passage extending outward from the top surface of said fuel tank, said system comprising a valve means having a valve body mounted on a wall which defines said filler vessel and having therein a chamber, a first port opening into said chamber and communicating with said fuel vapor passage of said fuel tank and a second port opening into said chamber and communicating with said engine, a valve member controlling communication between said first and second ports and projecting into said filler vessel, and a spring biasing said valve member toward a position to obstruct communication between said first and second ports, said valve member being held by said closure member against the action of said spring in a position to provide communication between said first and second ports when said closure member covers said filler vessel, said valve member being held by the action of said spring in a position to obstruct communication between said first and second ports when said closure member is opened during replenishment of said fuel tank thereby preventing said fuel tank from being filled by fuel to its full capacity.

2. An air-pollution preventive system according to claim 1, further comprising means defining a fuel vapor chamber communicating with said second port of said valve means, said means having therein a ventilation air inlet communicating with the atmosphere and opening into said fuel vapor chamber and a fuel vapor inlet communicating with said crankcase and opening into said fuel vapor chamber, a ventilation air check valve mounted in said ventilation air inlet, a fuel vapor check valve mounted in said fuel vapor inlet, a blow-by gas mixture conduit communicating said crankcase with said carburetor, and a blowby gas mixture check valve controlling communication between said crankcase and said carburetor, said ventilation air check valve being responsive to differences between pressures in the inside and the outside of said fuel vapor chamber between which said ventilation air check valve is put to introduce ventilation air into said fuel vapor chamber and to prevent fuel vapors entered in said fuel vapor chamber from escaping to the atmosphere, said fuel vapor check valve being responsive to differences between pressures in said crankcase and said fuel vapor chamber to introduce ventilation air and fuel vapors entered said fuel vapor chamber into said crankcase and to prevent blow-by gas mixture existing in said crankcase from escaping to said fuel vapor chamber, said blow-by gas mixture check valve being responsive to differences between pressures on the crankcase side and the carburetor side of said blow-by gas mixture check valve to introduce blow-by gas mixture, ventilation air and fuel vapors existing in said crankcase into said carburetor and to prevent said blow-by gas mixture and said fuel vapors introduced into said carburetor from returning to said crankcase.

3. An air-pollution preventive system according to claim 1, in which said valve member comprising a valve head movably accommodated in said chamber and controlling communication between said first and second ports, a valve stem securely fixed at an end thereof to said valve head and projecting into said filler vessel through said valve body, and a resilient member secured to the other end of said valve stem, said closure member having a projecting member which is securely mounted on the inside surface thereof and which engages said resilient member of said valve stem when said closure member is closed thereby biasing said valve member into said position to provide communication between said first and second ports.

4. An air-pollution preventive system according to claim 3, in which said valve member further comprises a circular stop secured to a portion of said valve stem which projects in said filler vessel, said spring engaging at an end thereof with said circular stop and engaging at the other end with said valve body thereby biasing said valve member toward said position to obstruct communication between said first and second ports.

5. An air-pollution preventive system according to claim 4, in which said valve means further comprises a bellow-like cover made of resilient material and enclosing said spring.

* * * * *

UNITED STATES PATENT OFFICE
CERTIFICATE OF CORRECTION

Patent No. 3,779,224                    Dated December 18, 1973

Inventor(s) Katsuhiro Tagawa and Takuzo Kurosawa

It is certified that error appears in the above-identified patent and that said Letters Patent are hereby corrected as shown below:

On the first page of the patent between "[21] Application No.: 230,739" and "[52] U.S. Cl. 123/136, 220/85VS" should appear --[30] Foreign Application Priority Date March 18, 1971 Japan..............46-15349--

Signed and sealed this 16th day of July 1974.

(SEAL)
Attest:

McCOY M. GIBSON, JR.                    C. MARSHALL DANN
Attesting Officer                       Commissioner of Patents